United States Patent
Stallings, Jr.

Patent Number: 5,275,086
Date of Patent: Jan. 4, 1994

[54] FLUID ACTUATOR WITH INTERNAL PRESSURE RELIEF VALVE

[75] Inventor: J. Craig Stallings, Jr., Gaston, N.C.
[73] Assignee: Unlimited Solutions, Inc., Battleboro, N.C.
[21] Appl. No.: 936,676
[22] Filed: Aug. 27, 1992
[51] Int. Cl.⁵ .......... F15B 11/08; F15B 13/04
[52] U.S. Cl. .................... 91/432; 91/437; 91/440; 137/328; 137/539; 251/360; 81/177.5; 81/461
[58] Field of Search .......... 91/420, 421, 432, 436, 91/437, 438, 440, 416; 137/327, 328, 539; 251/360; 81/461, 177.5

[56] References Cited

U.S. PATENT DOCUMENTS

| | | | |
|---|---|---|---|
| 1,397,876 | 11/1921 | Meldal | 81/461 |
| 2,887,990 | 5/1959 | Rogers | 121/38 |
| 3,074,384 | 1/1963 | Pilch | 121/40 |
| 3,349,671 | 10/1967 | Hoffman | 91/420 |
| 3,394,634 | 7/1968 | Pfundt | 92/181 |
| 3,472,547 | 10/1969 | London | 296/28 |
| 3,563,137 | 2/1971 | Graber | 91/414 |
| 3,654,835 | 4/1972 | Sievenpiper | 91/436 |
| 3,875,850 | 3/1975 | Reynolds et al. | 91/468 |
| 3,887,160 | 6/1975 | Cusveller | 251/31 |
| 3,942,551 | 3/1976 | Schuller et al. | 137/514 |
| 3,972,557 | 8/1976 | Hudston | 296/35 |
| 4,114,516 | 9/1978 | Johnson | 91/420 |
| 4,200,031 | 4/1980 | Skover, Jr. | 91/420 |
| 4,266,639 | 5/1981 | Schloth | 188/311 |
| 4,334,624 | 6/1982 | Detmold | 213/43 |
| 4,350,212 | 9/1982 | Hirose | 173/6 |
| 4,421,212 | 12/1983 | Fleck | 188/152 |

(List continued on next page.)

FOREIGN PATENT DOCUMENTS

| | | | |
|---|---|---|---|
| 1207456 | 2/1960 | France | 91/432 |
| 1496246 | 6/1967 | France | 81/461 |
| 2477240 | 9/1981 | France | 91/436 |

Primary Examiner—Edward K. Look
Assistant Examiner—Hoang Nguyen
Attorney, Agent, or Firm—Bell, Seltzer, Park & Gibson

[57] ABSTRACT

A fluid actuator of the type for producing reciprocal movement is provided having a cylindrical housing adapted to be secured to a relatively stationary object. The cylindrical housing includes first and second end portions and respective first and second fluid ports positioned therein. A piston is disposed for relative movement within the cylindrical housing and defines first and second fluid chambers within the housing. The first fluid chamber is in communication with the first fluid port and the second fluid chamber is in communication with the second fluid port. A piston rod connects to the piston and extends outwardly from the first end portion of the housing. The piston rod is adapted to be connected to an object to be moved. A conduit communicates with the first fluid chamber through the first fluid port in the first end portion of the housing and extends longitudinally from the first fluid port alongside the housing to the second end portion of the housing. Valve arrangement is disposed within the second end portion of the housing and in fluid communication with the second fluid chamber directly through the second fluid port and in fluid communication with the first fluid port through the conduit for controlling the fluid pressure within the chambers responsive to pressure in one of the chambers exceeding a predetermined pressure therein and to moderate movement of the piston responsive thereto. The valve arrangement includes an adjustable valve seat within the second end portion of the housing, a ball member positioned on the valve seat, and a spring cooperating with the ball member for maintaining the ball member in cooperating relation with the valve sat. Pressure selective apparatus cooperates with the adjustable valve seat for selectively adjusting the position of the valve seat which in turn adjusts the compression force of the spring on the ball member and to thereby adjust the predetermined pressure.

7 Claims, 2 Drawing Sheets

U.S. PATENT DOCUMENTS

| | | | |
|---|---|---|---|
| 4,433,615 | 2/1984 | Vick | 91/440 |
| 4,461,449 | 7/1984 | Turner | 251/62 |
| 4,551,104 | 11/1985 | Iwashita et al. | 440/56 |
| 4,565,265 | 1/1986 | Wooley | 188/72.6 |
| 4,588,053 | 5/1986 | Foster | 188/275 |
| 4,589,627 | 5/1986 | Grotloh | 91/416 X |
| 4,591,314 | 5/1986 | Weber | 417/47 |
| 4,611,621 | 9/1986 | Miyakawa et al. | 137/115 |
| 4,615,401 | 10/1986 | Garrett | 175/230 |
| 4,635,532 | 1/1987 | Tanino et al. | 91/436 |
| 4,667,570 | 5/1987 | Jensen, Jr. et al. | 91/420 |
| 4,687,259 | 8/1987 | Reinartz | 303/114 |
| 4,690,465 | 9/1987 | Takeda et al. | 303/119 |
| 4,718,330 | 1/1988 | Mitton | 92/129 |
| 4,783,128 | 10/1988 | Resch | 303/114 |
| 4,815,574 | 3/1989 | Taylor et al. | 188/280 |
| 4,834,135 | 5/1989 | DiBartolo | 137/514.5 |
| 4,843,949 | 7/1989 | Lambers et al. | 91/437 |
| 4,922,120 | 5/1990 | Becker | 303/114 |
| 4,932,727 | 6/1990 | Wagner | 303/114 |
| 4,938,290 | 7/1990 | Leggett | 166/387 |
| 5,004,079 | 4/1991 | Ivers | 188/282 |
| 5,038,825 | 8/1991 | Hilmer | 137/625 |
| 5,044,256 | 9/1991 | Budzich | 91/529 |
| 5,065,664 | 11/1991 | Ohta | 91/420 |

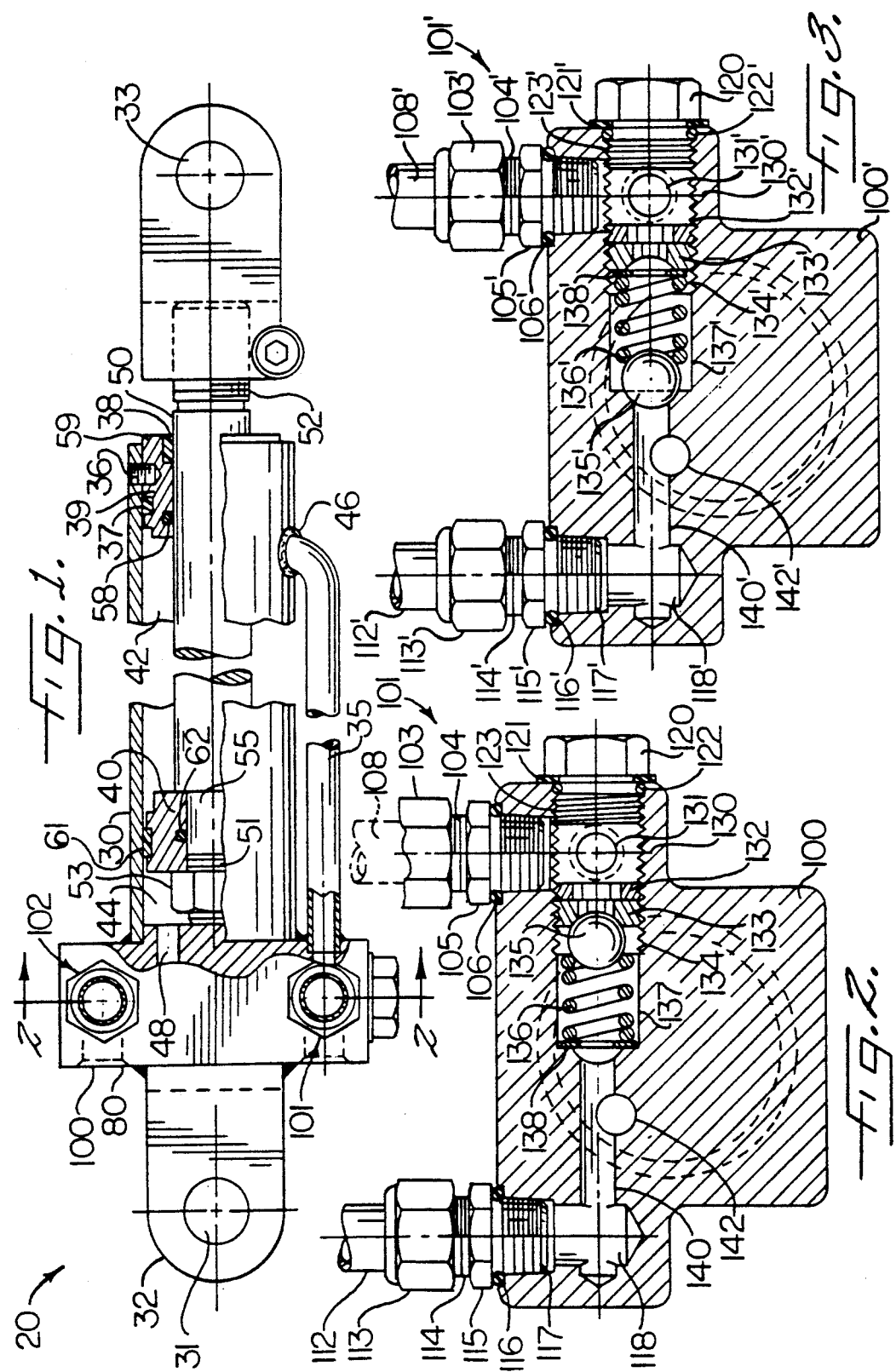

FLUID ACTUATOR WITH INTERNAL PRESSURE RELIEF VALVE

FIELD OF THE INVENTION

This invention relates to pressurized cylinders such as hydraulic or pneumatic cylinders, and more particularly to pressure-actuated cylinders having internal pressure relief valves.

BACKGROUND OF THE INVENTION

Generally, pressurized cylinders, such as hydraulic or pneumatic cylinders, are used for a variety of applications where one end of the cylinder is secured to a stationary object and the other end of the cylinder is secured to a movable object. These applications may include use in cars, trucks, trailers, buildings, and various machines for such functions as lifting, pulling or towing, or controlling movement between the objects. Cylinders in these typical applications often require limitations on the amount or type of pressure or control for movement between the objects. Various valves and the like were therefore developed to enhance these limitation requirements.

Several control valves for controlling pressure to these cylinders have been used for applications such as hydraulic brake systems for vehicles, such as seen in U.S. Pat. No. 4,932,727 by Wagner et al. entitled "Automotive Vehicle Brake System", U.S. Pat. No. 4,922,120 by Becker et al. entitled "Brake System With Slip Control", U.S. Pat. No. 4,783,128 by Resch entitled "Brake Pressure Control Unit With Hydraulic Power Booster Including Antilocking And Propulsion Regulation", U.S. Pat. No. 4,690,465 by Takeda et al. entitled "Antiskid Hydraulic Pressure Modulator For Vehicle Hydraulic Braking System", U.S. Pat. No. 4,687,259 by Reinartz et al. entitled "Hydraulic Brake System With Slip Control", U.S. Pat. No. 4,565,265 by Woolley entitled "Hydraulic Parking Brake", and U.S. Pat. No. 4,421,212 by Fleck entitled "Brake Control Valve Arrangement."

Various valves for these cylinders have also been developed for controlling the damping movement occurring between the stationary and moving object or to control the relative position between the two objects. Examples of these valves may be seen in U.S. Pat. No. 5,004,079 by Ivers et al. entitled "Semi-Active Damper Valve Means And Method", U.S. Pat. No. 4,815,574 by Taylor et al. entitled "Frictionless Damper", U.S. Pat. No. 4,588,053 by Foster entitled "Multiple Rate Shock Isolator Damping Valve", U.S. Pat. No. 4,551,104 by Iwashita et al. entitled "Tilt Lock Mechanism For Marine Propulsion Device", U.S. Pat. No. 4,350,212 by Hirose entitled "Step Feed Drilling Machine", U.S. Pat. No. 4,334,624 by Detmold entitled "Draft Gear Locking Device", U.S. Pat. No. 4,266,639 by Schloth entitled "Quick Response Hydraulic Shock Suppressor For Piping Systems", U.S. Pat. No. 4,200,031 by Skover, Jr. entitled "Locking Cylinders", U.S. Pat. No. 3,972,557 by Hudston et al. "Hydraulic Cab-Tilting Systems", U.S. Pat. No. 3,942,551 by Schuller et al. entitled "Hydraulic Damping Means For Hinged Check Valve", U.S. Pat. No. 3,875,850 by Reynolds et al. entitled "Double-Acting Lift Cylinder With Integral Velocity Fuses", U.S. Pat. No. 3,472,547 by London entitled "Safety Tilt System", U.S. Pat. No. 3,394,634 by Pfundt entitled "Internal Relief Valve For Hydraulically Actuated Pole Pullers", U.S. Pat. No. 3,349,671 by Hoffman entitled "Holding Valve With Thermal Relief", U.S. Pat. No. 2,887,990 by Rogers entitled "Lift Cylinder Regulator Valve", and U.S. Pat. No. 3,563,137 by Graber et al. entitled "Hydraulic Self-Leveling Control For Boom And Bucket."

Pressure relief valves have also been developed for relieving pressure applied to these cylinders by fluid or air supplied to the cylinder when the cylinder receives an excessive external pressure applied to a piston rod of the cylinder or to the retractable or extendable movement of a piston rod of the cylinder. These pressure relief valves, however, are typically mounted external to the cylinder. Examples of such valves may be seen in U.S. Pat. No. 5,044,256 by Budzich entitled "Exhaust Pressurizing Control For A Fluid System", U.S. Pat. No. 5,038,825 by Hilmer et al. entitled "Multiport Valve", U.S. Pat. No. 4,834,135 by DiBartolo entitled "Pressure Control Valve", U.S. Pat. No. 4,615,401 by Garrett entitled "Automation Hydraulic Thruster", U.S. Pat. No. 4,611,621 entitled "Pressure Control Valve And Oil Supply Device Using Said Valve", U.S. Pat. No. 4,591,314 by Weber entitled "Hydraulic Power Supply System Utilizing A Solid Propellant Gas Generator", U.S. Pat. No. 4,433,615 by Vick entitled "Blocking and Thermal Relief Valve", U.S. Pat. No. 4,114,516 by Johnson entitled "Anti-Cavitation And Pressure Modulating Relief Valve For Controlling Hydraulic Cylinders", and U.S. Pat. No. 3,887,160 by Cusveller entitled "Fluid Operated Actuator For Movable Members." Some of these valves have included pressure relief for both retractable and extendable movement as seen in U.S. Pat. No. 4,194,436 by Imada entitled "Speedup Device For Reciprocating Cylinders" and the book "Industrial Hydraulics", pp. 274–75 (3d ed. 1979) by Pippenger and Hicks.

Other pilot operated valves have been developed for these pressurized cylinders where pressure has been relieved by pilot operation of a third party or some other type of mechanical activation external to the cylinder housing. Examples of these pilot operated valves may be seen in U.S. Pat. No. 5,065,664 by Ohta et al. entitled "Control Circuit For A Cylinder Allowing Flow Between An Upper And A Lower Chamber", U.S. Pat. No. 4,718,330 by Mitton entitled "Hydraulic Cylinder", U.S. Pat. No. 4,667,570 by Jensen, Jr. et al. entitled "Integral Hydraulic Blocking And Relief Valve", U.S Pat. No. 4,461,449 by Turner entitled "Integral Hydraulic Blocking and Relief Valve", and U.S. Pat. No. 3,074,384 by Pilch entitled "Pilot-Operated Ball Check Valve In Cylinder Head."

These prior cylinders and valves, however, have multiple problems associated therewith. Some of these cylinders and valves are used for controlling the damping motion occurring during movement between the objects or for controlling the speed of the movement, such as when lifting a trailer bed off of a truck. Others have been used for specific applications such as hydraulic brake systems or are pilot operated wherein a third party is required to relieve the pressure or a separate pilot operated mechanical device is used.

Still others have pressure relief valves external to the cylinders which make the cylinders bulky, awkward, and difficult to use in compact spaces. Because of the many fluid lines required when an external pressure relief valve is connected to these cylinders, the pressurized system is more susceptible to mechanical failure due to the mounting of the cylinder, the rough conditions of usage, and the limited space where these cylinders may be installed.

Therefore, there is a continual need for a pressure-actuated cylinder having an internal pressure relief valve built into the cylinder which directly relieves pressure applied to the cylinder from either retraction or extension of the cylinder piston.

SUMMARY OF INVENTION

It is an object of the present invention to provide a pressure actuated cylinder having a pressure relief valve compactly built into an end portion of the housing of the cylinder for directly relieving pressure with respect to the relative movement of the cylinder piston.

These and other objects and advantages of the invention are provided more particularly by a pressure-actuated cylinder of the type that has reciprocal movement based upon the movement of fluid within the cylinder. The cylinder has a housing and a piston disposed for relative movement within the housing. The piston divides the housing into first and second fluid chambers having a first port in the first chamber and a second port in the second chamber. Means are disposed within the housing and are in fluid communication with the first chamber and the second chamber for directly controlling the fluid pressure applied to the piston through the first and second ports in the fluid chambers during reciprocal movement of the piston within the housing. The pressure control means controls the pressure applied to the piston based upon a selected predetermined pressure.

DESCRIPTION OF THE DRAWINGS

Some of the objects and advantages of the present invention having been stated, others will become apparent as the description proceeds when taken in conjunction with the accompanying drawings, in which:

FIG. 1 is an elevational view partially in cross section showing a pressure-actuated cylinder according to the present invention;

FIG. 2 is a cross sectional view taken along line 2—2 of FIG. 1 showing an internal pressure relief valve for relieving pressure during retraction of the piston according to the present invention;

FIG. 3 is a cross sectional view of another embodiment of an internal pressure relief valve for relieving pressure during extension of the piston according to the present invention;

DETAILED DESCRIPTION OF A PREFERRED EMBODIMENT

Figure 4:
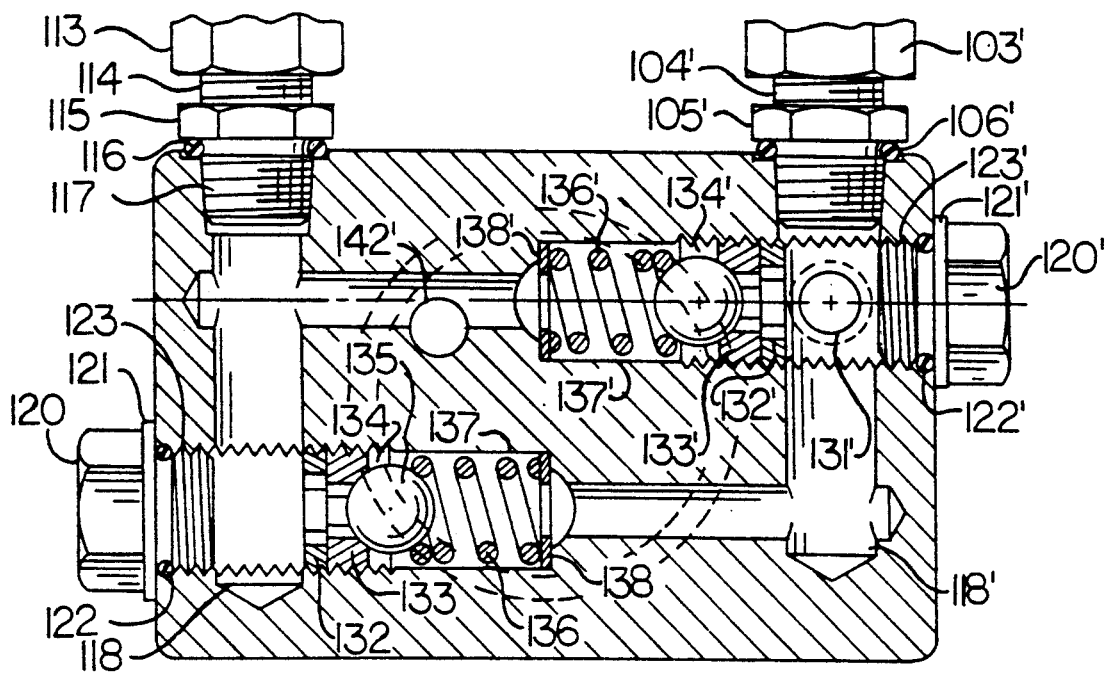
FIG. 4 is a cross sectional view of yet another embodiment of an internal dual pressure relief valve for relieving pressure during either retraction or extension of the piston according to the present invention.

The present invention now will be described more fully hereinafter with reference to the accompanying drawings in which a preferred embodiment of the invention is shown. This invention may, however, be embodied in may different forms and should not be construed as limited to the embodiment set forth herein; rather, this embodiment is provided so that this disclosure will be thorough and complete and will fully convey the scope of the invention to those skilled in the art. Like numbers refer to like elements throughout.

FIG. 1 shows an elevational view partially in cross section of a pressure-actuated cylinder broadly designated at 20 of the type that moves in reciprocal fashion based upon the movement of fluid within the cylinder 20. The cylinder 20 has a housing 30 and a piston 40 disposed for reciprocal movement within a portion of the housing 30. The piston 40 has a piston-to-housing seal 61 for restricting the passage of fluid between the piston 40 and the portion of the housing 30. The piston 40 divides a portion of the housing 30 into first 42 and second 44 fluid chambers. As the piston 40 moves within a portion of the housing 30, the relative volume or size of the first 42 and second 44 fluid chambers increases or decreases respectively. The first fluid chamber 42 has a first port 46 therein and the second fluid chamber 44 has a second port 48 therein. The pressure-actuated cylinder 20 further has a piston rod 50 connected to the piston 40 by a reduced rod portion 55 and has a rod-to-piston seal 62 to restrict the flow of fluid between the rod 50 and the piston 40. A threaded rod portion and nut 53 secure the rod 50 to the piston 40 within the housing 30.

In the illustrated embodiment, the piston rod 50 is further connected to a first lug member 34 by a threaded rod portion 52. The rod 50 moves in an upward or retractable motion and a downward or extendable motion through a gland 59 within a lower portion of the housing 30. An object to be moved by the cylinder 20 is typically connected to the first lug member 34 by opening 33. The gland 59 restricts the extendable motion of the rod 50 and piston 40. The gland 59 has gland-to-housing seal 37 and a rod-to-gland seal 58 for restricting the flow of fluid from the first fluid chamber 42 between the gland 59 and housing 30 and between the rod 50 and the gland 59 respectively. The gland 59 is secured to the lower portion of the housing 30 by a retaining ring 36 or other securing means.

As fluid flows into the first fluid chamber 42, the fluid entering the chamber 42 will cause the piston 40, and the rod 50 attached thereto, to retract within the housing 30. As the fluid flows into the second fluid chamber 44, the fluid entering the chamber 44 will cause the piston 40, and the rod 50 attached thereto, to extend. Hence, the upward or retractable and downward or extendable motions are illustrated.

Pressure control means, illustrated in the form of an internal pressure relief valve 100 for this embodiment, are disposed within an end portion 80 of the housing 30 and is in fluid communication with the first fluid chamber 42 and the second fluid chamber 44 for controlling the fluid pressure applied to the piston 40 through the first 46 and second 48 ports in the fluid chambers 42, 44 during reciprocal movement of the piston 40 within the housing 30. The pressure relief valve 100 controls the pressure applied to the piston 40 based upon a selected predetermined pressure. A second lug member 32 at an uppermost portion of the housing 30 typically attaches or connects to the stationary object through opening 31.

FIGS. 2-4 are cross sectional views of various embodiments of the internal pressure relief valve 100 for reciprocal movement, such as retraction, extension, and both retraction and extension, of the piston 40, and the piston rod 50 attached thereto, of the pressure-actuated cylinder 20. The same element numbers are used for similar elements in each of the embodiments hereinafter. The designation of the prime symbol for the numbers generally indicates the use of the elements in the extendable operation of the piston 40 of the cylinder 20 and the general interchangeability of various elements to form various embodiments of the invention. FIG. 2 is a cross sectional view taken along line 2—2 of FIG. 1 showing an internal pressure relief valve 100 for relieving pressure during retraction or retractable movement of the piston 40. The internal pressure relief valve 100 has a passageway within the housing 30 for communicating between the first 42 and second 44 fluid chambers. In the illustrated embodiment, this passageway is shown as the combination of passages "118 and 130." The pressure relief valve 100 further has a valve in the passage 118, 130 that prevents fluid from communicating between the first 42 and second 44 fluid chambers during reciprocal movement of the piston 40 until the pressure in one of the chambers, shown as the first fluid chamber 42 in FIG. 2, increases beyond the selected predetermined pressure and opens the valve to permit fluid to flow between the first 42 and second 44 fluid chambers to thereby moderate the effect of excess pressure in the one chamber and thereby moderate the movement of the piston 40 and any items attached thereto.

The pressure relief valve 100 within an end portion 80 of the housing 30 of the pressure-actuated cylinder 20 has a valve seat 133 in the passage 118, 130, a ball member 135 against the valve seat 133 selectively engageable with the valve seat 133 in the passage, and a spring 136 for biasing the ball member 135 in opposition to fluid pressure from the first fluid chamber 42. A washer 138 is located within the passage to retain or restrict the movement within the passage. The relief pressure in the pressure-actuated cylinder 20 may be internally adjusted by adjusting the predetermined pressure at which the valve will open. The pressure may be internally adjusted by having the valve seat 133 being threaded so that selective adjustments to the threaded valve seat 133 changes the compression force of the spring 136 against the ball member 135.

The pressure-actuated cylinder 20 further has means, shown as the openings 101, 102, in the passages of the pressure relief valve 100 for supplying a fluid to at least one of the chambers from an external source. The pressure relief valve 100 may be used for controlling the pressure of a liquid or for controlling the pressure of a gas. The liquid will typically be a hydraulic fluid or the like and the gas will typically be air or the like.

FIG. 3 is a cross sectional view of another embodiment of an internal pressure relief valve 100 for relieving pressure during extension or extendable movement of the piston 40 according to the present invention. FIG. 3 has similar elements as shown in FIG. 2, but arranged in a different orientation within the end portion 80 of the housing 30. These similar elements are generally designated with prime numbers hereinafter. The ball member 135' in this embodiment seats or is biased against a chamfered passage portion 140' of the passage 118', 130' instead of the valve seat 133'.

FIG. 4 is a cross sectional view of yet another embodiment of an internal dual pressure relief valve 100 for relieving pressure during either retractable or extendable movement of the piston 40 according to the present invention. The pressure relief valve 100 of the pressure-actuated cylinder 20 in this embodiment has a first passage generally designated as 130' within the upper portion 80 of the housing 30 for communicating between the first 42 and second 44 fluid chambers. The pressure relief valve 100 also has a second passage 118 within upper portion 80 of the housing 30 for communicating between the first 42 and second 44 fluid chambers. A first valve in the first passage 130' prevents fluid from communicating between the first 42 and second 44 fluid chambers during retractable movement of the piston 40 until the pressure in the first fluid chamber 42 increases beyond the selected predetermined pressure and opens the first valve to permit fluid to flow to the second fluid chamber 44 to thereby moderate the effect of excess pressure in the first fluid chamber 42 and thereby moderate the movement of the piston 40 and any items attached thereto. A second valve in the second passage 118 prevents fluid from communicating between the first 42 and second 44 fluid chambers during extendable movement of the piston 40 until the pressure in the second fluid chamber 44 increases beyond the selected predetermined pressure and opens the second valve to permit fluid to flow to the first fluid chamber 42 to thereby moderate the effect of excess pressure in the second fluid chamber 44 and thereby moderate the movement of the piston 40 and any items attached thereto.

Like the other embodiments shown in FIGS. 2 and 3, the pressure relief valve 100 also has means for adjusting the predetermined pressure at which the first or second valve will open. The first valve has a first valve seat 133' in the first passage 130', a first ball member 135' selectively engageable with the first valve seat in the first passage 130', and a first spring 136' for biasing the first ball member 135' in opposition to fluid pressure from the first fluid chamber 42. For pressure adjustments to the first valve, the first seat valve 133' may be threaded so that selective adjustments to the first threaded valve seat 133' changes the compression force of the first spring 136' against the first ball member 135'.

The second valve, in turn, has a second valve seat 133 in the second passage 118, a second ball member 135 selectively engageable with the second valve seat 133 in the second passage 118, and a second spring 136 for biasing the second ball member 135 in opposition to fluid pressure from the second fluid chamber 44. For pressure adjustments to the second valve, the second valve seat 133 may be threaded so that selective adjustments to the second threaded valve seat 133 changes the compression force of the second spring 136 against the second ball member 135.

Selective pressure adjustments to the first threaded valve seat 133' may be made by an adjustment key 200 for being connected in the first passage 130'. Likewise, selective pressure adjustments to the second threaded valve seat 133 may be made by an adjustment key 200 for being connected in said second passage 118. The use of the adjustment key 200 and its connection to the first 130' or second 118 passages of FIG. 4 or the passages of FIGS. 2 and 3 are further illustrated in FIGS. 5 and 6.

Figure 5:
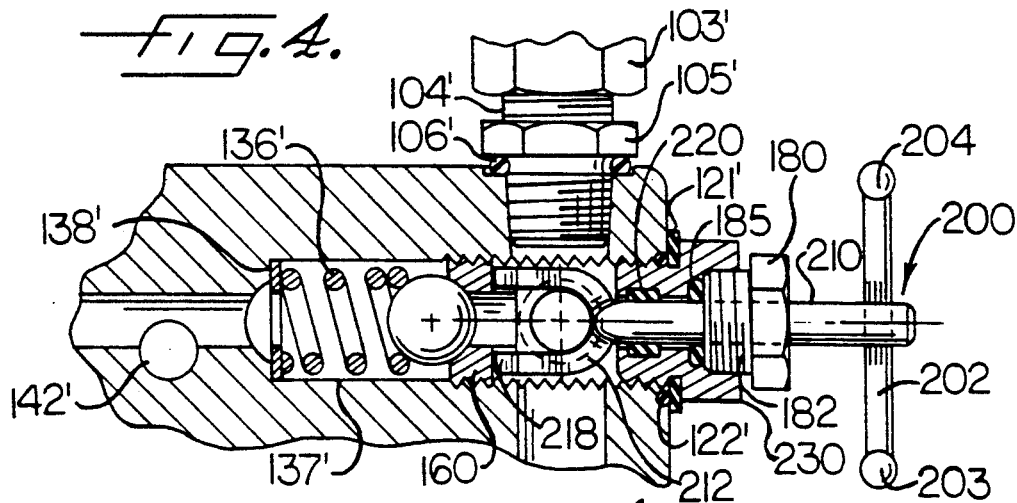
FIG. 5 is a cross sectional view of an internal pressure relief valve with parts broken away for clarity having an external adjustment key for adjusting pressure according to the present invention.
Figure 6:
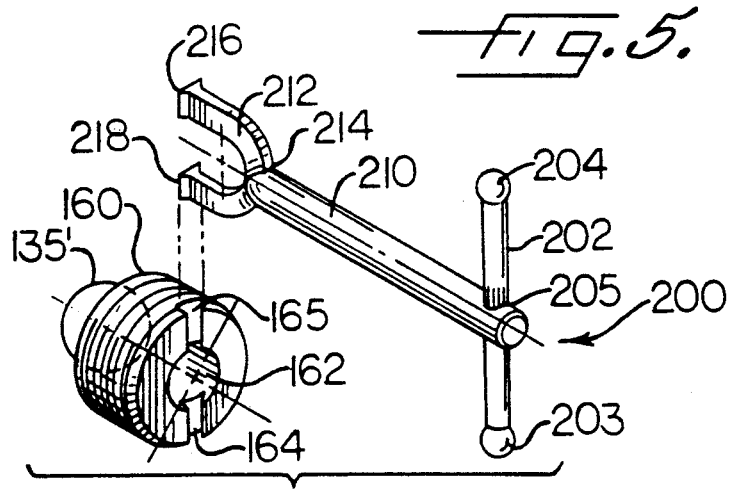
FIG. 6 is an exploded perspective view of the external adjustment key for adjusting pressure within the pressure relief valve according to the present invention.

FIGS. 5 and 6 illustrate the use of an external adjustment key 200 for adjusting the level of pressure for relief within the internal pressure relief valve 100 according to the present invention. FIG. 5 is a cross sectional view of an internal pressure relief valve 100 with parts broken away for clarity having an external adjustment key 200 for adjusting pressure. FIG. 6 is an exploded perspective view of the external adjustment key 200 for adjusting pressure within the pressure relief valve 100 according to the present invention. The adjustments to the pressure in the pressure relief valve 100 of the pressure-actuated cylinder 20 may be made by selectively adjusting the threaded valve seat 160 by use of the adjustment key 200 connected to the passage by a plug nut 180 having an axial passage therethrough. The plug nut 180 has a nut seal 185 adjacent the plug nut 180 for sealing the plug nut 180 within the passage. A passage seal 220 is also within the passage and surrounds the adjustment key 200 for further sealing the adjustment key 200 within the passage.

The adjustment key 200, as shown in FIG. 6, has a first longitudinal elongated rod 210, a second elongated rod 202 transverse to the first rod 210 and slideably connected to an end portion 205 of the first rod 210, and a prong member 212 connected to the other end portion 214 of the first rod 210. The prong member 212 is generally U-shaped and interfaces with the threaded valve seat 180 along prong end members 216, 218. An exploded view of threaded adjustment valve seat 160 having grooves 164, 165 and an axial passage 162 therethrough is also shown in FIG. 6. This view illustrates the engaging arrangement between the adjustment key 200 and the threaded adjustment valve seat 160 for turning the adjustment key 200 to thereby adjust the pressure within the passage for the pressure relief valve 100.

In the drawings and specification, there have been disclosed typical preferred embodiments of the invention and, although specific terms are employed, they are used in a generic and descriptive sense only and not for the purposes of limitation, the scope of the invention being set forth in the following claims.

That which is claimed is:

1. A fluid actuator of the type for producing reciprocal movement, said actuator comprising:

a cylindrical housing adapted to be secured to a relatively stationary object, said housing having first and second end portions and respective first and second fluid ports positioned therein;

a piston disposed for relative movement within said housing, said piton defining first and second fluid chambers within said housing, said first fluid chamber being in communication with said first fluid port and said second fluid chamber being in communication with said second fluid port;

a piston rod connected to said piston and extending outwardly from said first end portion of said housing, said piston rod adapted to be connected to an object to be moved;

a conduit communicating with said first fluid chamber through said first fluid port in said first end portion of said housing, said conduit extending longitudinally from said first fluid port alongside said housing to said second end portion of said housing;

valve means disposed within said second end portion of said housing and in fluid communication with said second fluid chamber through said second fluid port and in fluid communication with said first fluid port through said conduit for controlling the fluid pressure within said chambers responsive to pressure in one of said chambers exceeding a predetermined pressure therein and to moderate movement of said piston responsive thereto, said valve means comprising an adjustable valve seat within said second end portion of said housing, a ball member positioned on said valve seat, and a spring cooperating with said ball member for maintaining said ball member in cooperating relation with said valve seat; and pressure selective means cooperating with said adjustable valve seat for selectively adjusting the position of said valve seat which in turn adjusts the compression force of said spring on said ball member and to thereby adjust said predetermined pressure.

2. A fluid actuator according to claim 1, wherein said adjustable valve seat has a groove in an end thereof; and wherein said pressure selective means comprises a key mounted in engagement with said groove to thereby selectively adjust the position of said adjustable valve seat by rotation of said key.

3. A fluid actuator according to claim 1, further comprising:

a first lug member secured to said end of said piston rod extending outwardly from said first end portion of said cylindrical housing and adapted to be connected to an object to be moved; and wherein said second end portion includes a second lug member extending outwardly therefrom and adapted to be connected to a stationary object.

4. A fluid actuator of the type for producing reciprocal movement, said actuator comprising:

a cylindrical housing adapted to be secured to a relatively stationary object, said housing having first and second end portions and respective first and second fluid ports positioned therein;

a piston disposed for relative movement within said housing, said piston defining first and second fluid chambers within said housing, said first fluid chamber being in communication with said first fluid port and said second fluid chamber being in communication with said second fluid port;

a piston rod connected to said piston and extending outwardly from said first end portion of said housing, said piston rod adapted to be connected to an object to be moved;

a conduit communicating with said first fluid chamber through said first fluid port in said first end portion of said housing, said conduit extending longitudinally from said first fluid port alongside said housing to said second end portion of said housing;

said second end portion of said housing having a passageway disposed therein and in fluid communication with said second fluid chamber through said second fluid port and in fluid communication with said first fluid port through said conduit;

valve means disposed within said passageway of said second end portion of said housing and in fluid communication with said second fluid chamber through said second fluid port and in fluid communication with said first fluid port through said conduit for controlling the fluid pressure within said first and second chambers responsive to pressure in any one of said chambers exceeding a predetermined pressure therein and to moderate movement of said piston responsive thereto, said valve means comprising a pair valves disposed within said passageway and arranged in fluid communication with each other so that when one valve is urged in an open position the other valve is urged in a closed position, each of said valves comprising an adjustable valve seat, a ball member positioned on said valve seat, and a spring cooperating with said ball member for maintaining said ball members in cooperating relation with said valve seat; and pressure selective means cooperating with said adjustable valve seat of each of said pair of valves within said passageway for selectively adjusting the position of said valve seat which in turn adjusts the compressing force of said spring on said ball member and to thereby adjust said predetermined pressure.

5. A fluid actuator according to claim 4, wherein said pair of valves are positioned generally parallel to each other within said passageway and said adjustable valves seats of each of said valves are distally located from each other.

6. A fluid actuator according to claim 4, wherein said adjustable valve seat has a groove in an end thereof; and wherein said pressure selective means comprises a key mounted in engagement with said groove to thereby selectively adjust the position of said adjustable valve seat by rotation of said key.

7. A fluid actuator according to claim 4, further comprising:

a first lug member secured to said end of said piston rod extending outwardly from said first end portion of said cylindrical housing and adapted to be connected to an object to be moved; and wherein said second end portion includes a second lug member extending outwardly therefrom and adapted to be connected to a stationary object.

* * * * *